May 1, 1962            E. O. OLSEN            3,032,705
INDUCTANCE VARYING MECHANICAL ADJUSTOR OF ELECTRICAL CURRENT
Filed Sept. 12, 1958
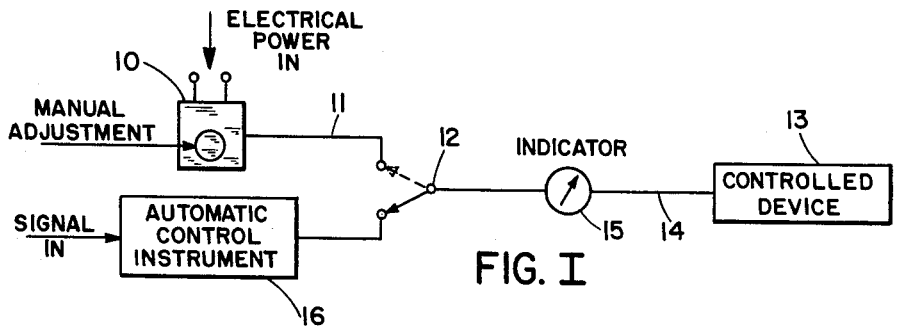
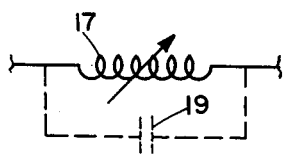
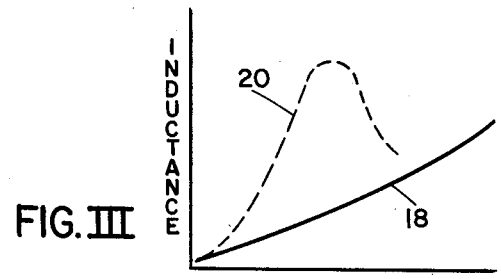
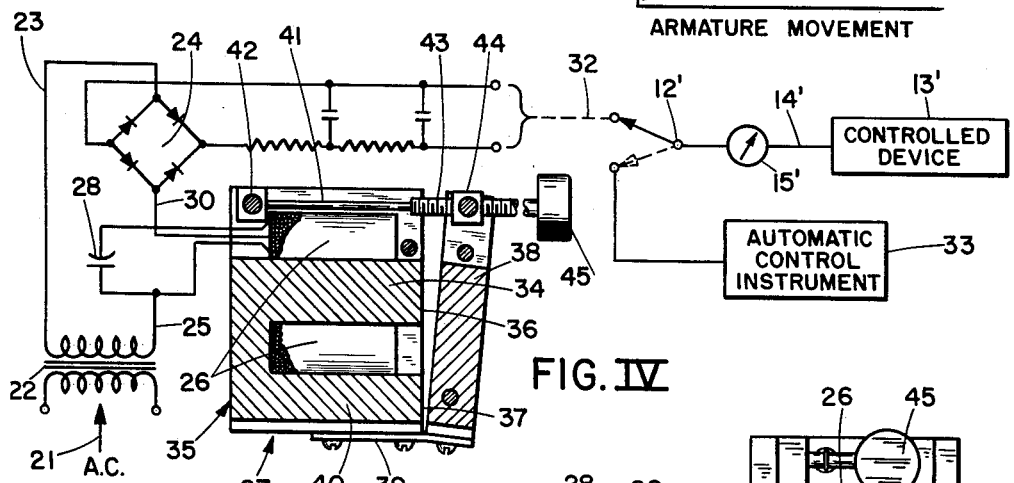
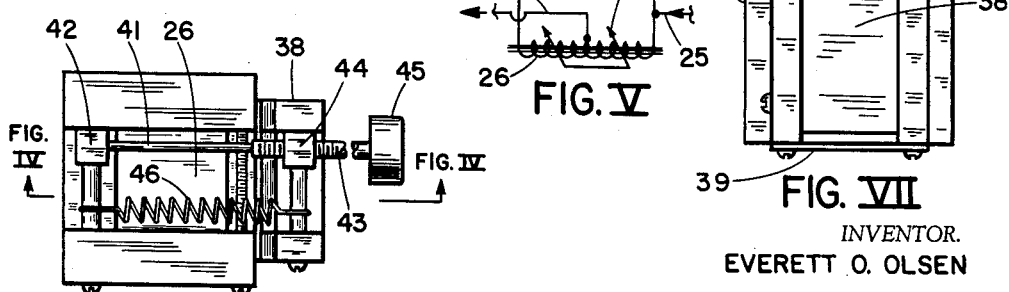
INVENTOR.
EVERETT O. OLSEN
BY
*Lawrence H. Potton*
AGENT United States Patent Office 3,032,705
Patented May 1, 1962

3,032,705
INDUCTANCE VARYING MECHANICAL ADJUSTOR OF ELECTRICAL CURRENT
Everett O. Olsen, Wrentham, Mass., assignor to The Foxboro Company, Foxboro, Mass., a corporation of Massachusetts
Filed Sept. 12, 1958, Ser. No. 760,785
1 Claim. (Cl. 323—76)

This invention relates to means for regulating electrical current in an electrical circuit, and has particular reference to a mechanically operated device for accomplishing such regulation by varying an inductance.

A feature of this invention is the provision of large electrical current change per unit of mechanical change. This feature is accomplished by varying the inductance of an inductance-capacitance combination in a manner to variably relate the combination to resonance along a side of the resonance curve of the combination.

The device of this invention is free from the explosion hazards associated with prior art structures of the slide-wire type, which tended to produce sparking. Further, this device makes possible a large power handling capacity which is impractical in condenser adjustment devices.

This invention incorporates an inductance-capacitance combination to which an alternating current is applied. The inductance is an electromagnet with a movable armature. Movement of the armature may be manual, and by changing the inductance, it changes the relation of the combination to resonance. This change occurs as on a side of the resonance curve, providing a large inductance (and consequently current) change for a small movement of the armature.

It is, accordingly, an object of this invention to provide a new and improved mechanical adjustor of electrical current.

Other objects and advantages of this invention will be in part apparent and in part pointed out hereinafter.

In the drawings:

FIGURE I is a schematic illustration of the use of the device of this invention in a control system;

FIGURE II is a circuit arrangement illustrating the operation of the device of this invention;

FIGURE III is a curve arrangement associated with and in explanation of the circuit arrangement of FIGURE II;

FIGURE IV is a circuit embodying this invention and incorporating the mechanical adjustment according to this invention;

FIGURE V is an illustration of the electromagnet connections in the device of FIGURE IV;

FIGURE VI is a top view of the mechanical adjustment device of FIGURE IV; and

FIGURE VII is a right hand end view of the mechanical adjustment device as viewed in FIGURE IV.

The FIGURE I schematic illustration of a system embodying this invention shows therein a device 10 which is a regulator in accordance with the present invention. This regulator 10 is electrically powered, as illustrated and is a manual adjustment device as an illustrative example of this invention. The output of the adjustment device 10 is electrical as through lead 11 to a switch device 12. When the switch 12 is connected to tie in the adjustment device 10, a controlled device 13 is operated from the manual adjustment device 10 through the output lead 11 and the switch 12 and a control lead 14. An indicator 15 is provided in the control lead 14 as a means of continually showing the value of the signal being applied to the controlled device.

The manual adjustment device 10 of FIGURE I is associated with an automatic control instrument 16 which operates through the switch 12, when connected and through the control lead 14 to the controlled device 13. It should be noted that the device of this invention, that is the manual adjustment device 10, operates directly to the control device and not through any part of the automatic control instrument 16. Thus a manual operation may be achieved, as desired, for example in process start-up times, or for spot check and adjustment, and like situations.

The showing of FIGURES II and III together are for the purpose of explaining the general function of the device of this invention. In FIGURE II a variable inductance coil 17 is indicated as a solid line. In FIGURE III a solid line curve 18 is shown as representing the inductance change resulting from armature movement with respect to a device having simply the solid line coil 17 of FIGURE II. The slope of the curve 18 is gentle and does not provide a large inductance change for each unit of change in armature movement. On the other hand as in FIGURE II a condenser 19, shown in a parallel arrangement with the inductance 17, provides a coil and condenser combination which with suitably selected values and adjustment may be brought to resonance with an alternating current input. In such a case variation of the inductance of the coil 17 would tend to move the electrical action of the combination of the coil and condenser toward or away from a point of resonance as indicated by the dotted line curve 20 in FIGURE III. This resonance curve 20 provides a much greater change in inductance per unit of armature movement than does the system of the coil 17 alone as indicated by the curve 18. Thus by providing such a circuit arrangement and by working on a side slope of the curve 20 the device of this invention provides means for accomplishing substantial inductance change for a small armature movement change and in consequence provides a substantial change in output current for a small armature movement change.

It is important in modern instrumentation in many instances to provide electrical output signals such as current changes in substantial strength. Such changes are needed to operate the modern instrumentation devices such as recorders, valve operators, linkages or the like. At the same time it is important that such devices have a substantial safety factor. Thus it is not practical to use a slide-wire arrangement due to the tendency toward sparking. A variable inductance device is accordingly desirable but in the ordinary sense of usage in operation such a device cannot provide a sufficient change in output current per unit adjustment movement, and applicant's device is therefore provided to accomplish this necessary function. Even where the current change necessary to operate a control device may be relatively small, in view of the load character of the control device with respect to the adjustment device, the adjustment device itself must provide a substantially greater change and this in turn emphasizes the need for a change which is substantial as indicated by the combination of FIGURES II and III.

FIGURES IV through VII may all be considered together since FIGURES V, VI and VII are simply explanatory views of the electromagnet structure of FIGURE IV.

In FIGURE IV the overall circuit is supplied with an alternating current input 21 through a transformer 22. One of the output leads of the transformer 22 as at 23 is taken as one side of the supply to a rectifier bridge 24 and the other input lead from the transformer 22 as at 25 is as indicated in FIGURE V taken to one end of a variable inductance coil 26 in an electromagnet indicated generally in FIGURE IV as 27.

Again referring to FIGURE V the electromagnetic variable inductance coil 26 has a condenser 28 mounted across the ends of the coil 26 and in parallel therewith. This combination of coil 26 and condenser 28 is the combination which is adjusted with respect to resonance. This adjustment is indicated in FIGURE V by the pair of arrows 29 as indicative of a mechanical motion for varying the inductance of the coil 26. The output of the electromagnetic circuit of FIGURE V is taken as a center tap 30 from the coil 26 and applied to the rectifier bridge 24 as second input lead thereto, the first being the lead 23 directly from the input transformer 22. This output tap 30 may be taken at any selected point along the coil 26. The whole coil is used in the resonance system to allow the use of a condenser of practical size. Only part of the coil is used in the overall system to get a low voltage, high current condition. Thus this device is a combination resonance system and auto-transformer. The output from the rectifier bridge 24 is applied to a filter unit 31 and from there suitably electrically as indicated by dotted line 32 is applied to a switch device 12' like that shown in FIGURE I for shifting from automatic control as at 33 in FIGURE IV to the mechanical control according to this invention and as illustrated as a manual adjustment device. Further in FIGURE IV the operation of the device is through a control lead 14' through a controlled device 13' with an indicator 15' in the controlled lead 14'.

The coil-condenser system of FIGURE V is shown as a structure in FIGURE IV in terms of the coil 26 wound around one leg 34 of a U-shaped electromagnetic core 35. Thus the coil 26 of FIGURE V, as illustrated in FIGURE IV, is provided with a core having a pair of poles 36 and 37 in a single plane. An armature 38, as in FIGURE IV, is mounted for movement toward and away from the electromagnetic 27 and specifically toward and away from the poles 36 and 37. This movement in varying the air gap of the electromagnet provides a change in flux which results in the change in inductance in the coil 26. The armature 38 is mounted on a flexure 39 at one end of the armature and on one leg 40 of the electromagnet core 35. The armature 38 is extended transversely across the electromagnet in such a fashion that pivotal flexure about the mounting 39 provides displacement of the armature 38 with respect to the electromagnet on an angular basis so that the air gap changes may be substantial and yet provided in desirably small increments. The movement of the armature 38 with respect to the magnet is provided by means of an adjustment shaft 41 which has one end rotatably based in a block 42 adjacent the bottom of the U of the magnet core and which has its other end threaded as at 43 through an adjustment block 44 which is pivotally mounted on the armature 38. Thus by rotating the adjustment rod 41 as by the knob 45 the screw thread arrangement causes the armature 38 to be moved toward or away from the electromagnet on a small increment basis.

As shown in FIGURE VI a return spring 46 is provided for biasing the armature 38 against the action of the adjustment rod 41.

This invention therefore provides a new and improved mechanically operated control device for providing a large increment in the output current of electrical circuit for a small unit of mechanical movement. This is accomplished on the basis of a change in inductance which provides a change in a relationship of a coil-condenser circuit combination toward or away from the point of resonance on the basis of working on a slide slope of the resonance curve where the inductance change is large with respect to a mechanical movement unit action, as illustrated as a movement of an armature with respect to an electromagnet.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A mechanically operated inductance varying adjustor electrical circuit system for providing large electrical current change per unit of mechanical change, said system comprising, in combination, an overall electrical circuit, a parallel resonance circuit series connected into one side of said overall circuit, said resonance circuit including a variable inductance coil and a condenser connected across said coil, with said coil sufficiently large to enable said condenser to be relatively small, an intermediate tap on said coil, said series connection of said resonance circuit comprising a single output connection to said intermediate tap and a single input connection to a point between said condenser and said coil, said variable inductance coil formed as a U shaped electromagnet, with the coil wound about one leg of the U only with an armature pivoted at the outer end of the other leg of said U and movable toward and from the open end of said U and said coil to vary the inductance thereof, and means for moving said armature comprising a threaded, headed bolt which is pivoted at one end to the body of said electromagnet and which, adjacent the other end, is pivoted in and threaded to said armature, a coil spring biasing said armature toward said magnet said movement of said armature consequently arranged to vary the inductance of said coil and therefore to adjust the relation of said coil and condenser with respect to resonance along a side of the resonance curve of said resonance circuit, whereby a small movement of said armature results in a large electrical current change in said overall circuit.

References Cited in the file of this patent

UNITED STATES PATENTS

| | | |
|---|---|---|
| 1,908,522 | Lyden | May 9, 1933 |
| 1,993,914 | Bohm | Mar. 12, 1935 |
| 2,133,919 | Fries | Oct. 18, 1938 |
| 2,175,379 | Dellenbaugh | Oct. 10, 1939 |
| 2,443,300 | Carter | June 15, 1948 |
| 2,591,582 | Monette | Apr. 1, 1952 |
| 2,696,583 | Brown | Dec. 7, 1954 |
| 2,786,941 | Bierl | Mar. 26, 1957 |